United States Patent [19]

Anderson et al.

[11] 4,005,880
[45] Feb. 1, 1977

[54] GAS SERVICE CONNECTOR FOR PLASTIC PIPE

[75] Inventors: Gerald L. Anderson; Wilbur R. Kresge, both of Bradford, Pa.

[73] Assignee: Dresser Industries, Inc., Dallas, Tex.

[22] Filed: July 3, 1975

[21] Appl. No.: 592,974

[52] U.S. Cl. .................. 285/47; 285/138; 285/179; 285/294; 285/256
[51] Int. Cl.² ........................ F16L 11/12
[58] Field of Search .......... 285/55, 138, 179, 15, 285/294, 256, 297, 259, 47, 382, 382.2

[56] References Cited

UNITED STATES PATENTS

| | | | |
|---|---|---|---|
| 3,224,794 | 12/1965 | Crissy | 285/256 |
| 3,244,438 | 4/1966 | Bucheit | 285/15 |
| 3,578,360 | 5/1971 | Eliot | 285/55 |
| 3,700,268 | 10/1972 | Nielsen, Jr. | 285/55 |
| 3,814,466 | 6/1974 | Leopold | 285/55 |
| 3,828,823 | 8/1974 | Douglas | 285/55 |
| 3,837,686 | 9/1974 | Powell | 285/55 |
| 3,861,719 | 1/1975 | Hand | 285/138 |
| 3,922,008 | 11/1975 | Stiner | 285/138 |

FOREIGN PATENTS OR APPLICATIONS 688,918  6/1964  Canada ................. 285/55

Primary Examiner—Andrew V. Kundrat
Attorney, Agent, or Firm—Daniel Rubin

[57] ABSTRACT

A gas service connector for connecting a plastic underground gas service line to an aboveground meter installation. Comprising the connector is a continuous length of gas carryable plastic tubing concentrically spaced within a tubular elbow-shaped gas-free steel pipe jacket. The spacing at each end of the sleeve and tubing is gasket sealed against leakage with their common end aboveground being interlocked to resist axial displacement therebetween. In one embodiment the spacing between sleeve and tubing in at least the aboveground portion defines an air space rendering the unit capable of withstanding aboveground temperatures of up to about 100° F. For withstanding higher aboveground temperatures to 150° F. the spacing between tubing and sleeve in a second embodiment is filled with a reinforced epoxy from at least just belowground level.

10 Claims, 4 Drawing Figures

GAS SERVICE CONNECTOR FOR PLASTIC PIPE

BACKGROUND OF THE INVENTION

1. The field of art to which the invention pertains comprises the art of pipe joints that includes a protector for the commodity carrying pipe portion thereof.

2. Service connectors are commonly employed for connecting an underground gas service line to an aboveground meter installation as for a public utility gas supply to a residence or the like. Such service connectors, also commonly termed "meter risers", are available from a variety of manufacturers and typically comprise an elongated length of elbow-shaped steel riser pipe unioned at both ends for enabling suitable connections to be made. Because of the combustibility of the gas and the hazards posed by potential pipe failure, government Code regulations (Department of Transportation, Title 49, Section 192) require that the gas carrying steel riser be cathodically protected and periodically inspected for signs of deterioration and/or damage from which failure could result. Even where the service line and/or main are constructed of acceptable plastic composition such as polyethylene, these same Code regulations have effectively precluded use of plastic service risers because of higher anticipated aboveground temperatures at which tensile strength of the riser would diminish. Thus, despite recognition of the gas carrying capability of plastic pipe and the elimination of cathodic protection and associated economic savings that would result if such service connectors were constructed of plastic rather than steel, it has not heretofore been known how to economically and consistently construct such a service connector with the reliability demanded by safety and by the industry. A form of gas service connector for plastic pipe is disclosed in U.S. Pat. No. 3,837,686.

SUMMARY OF THE INVENTION

The invention relates to a gas service connector and more specifically to an improved gas service connector for connecting a gas underground plastic service line to an aboveground gas meter installation. Comprising the service connector in accordance herewith is a continuous length of plastic tubing providing the gas carrying conduit from a connection with an underground plastic service line with which it is to be used. A tubular metallic sleeve in the form of a steel pipe section bent in elbow shape is concentrically spaced by means of a centering ring about the tubing to jacket or shroud the plastic tubing from its environment while providing an exterior thread at its aboveground end to receive the meter connection. At least the meter end of the tubing and sleeve is sealed against gas leakage by a gasket in the spacing while the belowground end may include a gasket seal to prevent ground water leakage. In order to prevent axial displacement therebetween an interlock is provided by means of an inward swage on the sleeve at a location behind the thread coinciding with location of the seal gasket and a lock insert within the tubing. With substantially the remainder of the concentric spacing aboveground defining an air space between the tubing and sleeve, the unit is capable of complying with Department of Transportation Code requirements for contemplated 100° F. aboveground installations. Filling the air space in at least the aboveground sections with a reinforced epoxy resin renders the service connector capable of complying with Department of Transportation Code requirements for contemplated 150° F. aboveground installations.

When constructing the service connector in accordance with the above, the components are so secured together as to be capable of resisting and withstanding the mechanical forces normally encountered during installation. At the same time, their resistance to axial displacement is at least equal to the tubing strength in tension at 100 and 150°, respectively. Since the steel pipe sleeve is not per se a gas carrying conduit, previously required cathodic protection and associated expense therefor can be eliminated without risk to the installation. As a result of this construction, the previous problems associated with providing a service connector for plastic piping is resolved in a reliable and economic manner.

It is therefore an object of the invention to provide a novel service connector utilizing plastic connector conduit for connecting a gas underground plastic service line to an aboveground meter installation.

It is another object of the invention to provide a novel method for fabricating the service connector of the previous object.

It is a still further object of the invention to effect the foregoing objects in an economical and consistently reliable manner for fulfilling a long felt need in more readily accommodating underground gas service lines of plastic composition.

Figures 1, 2, 3, 4:
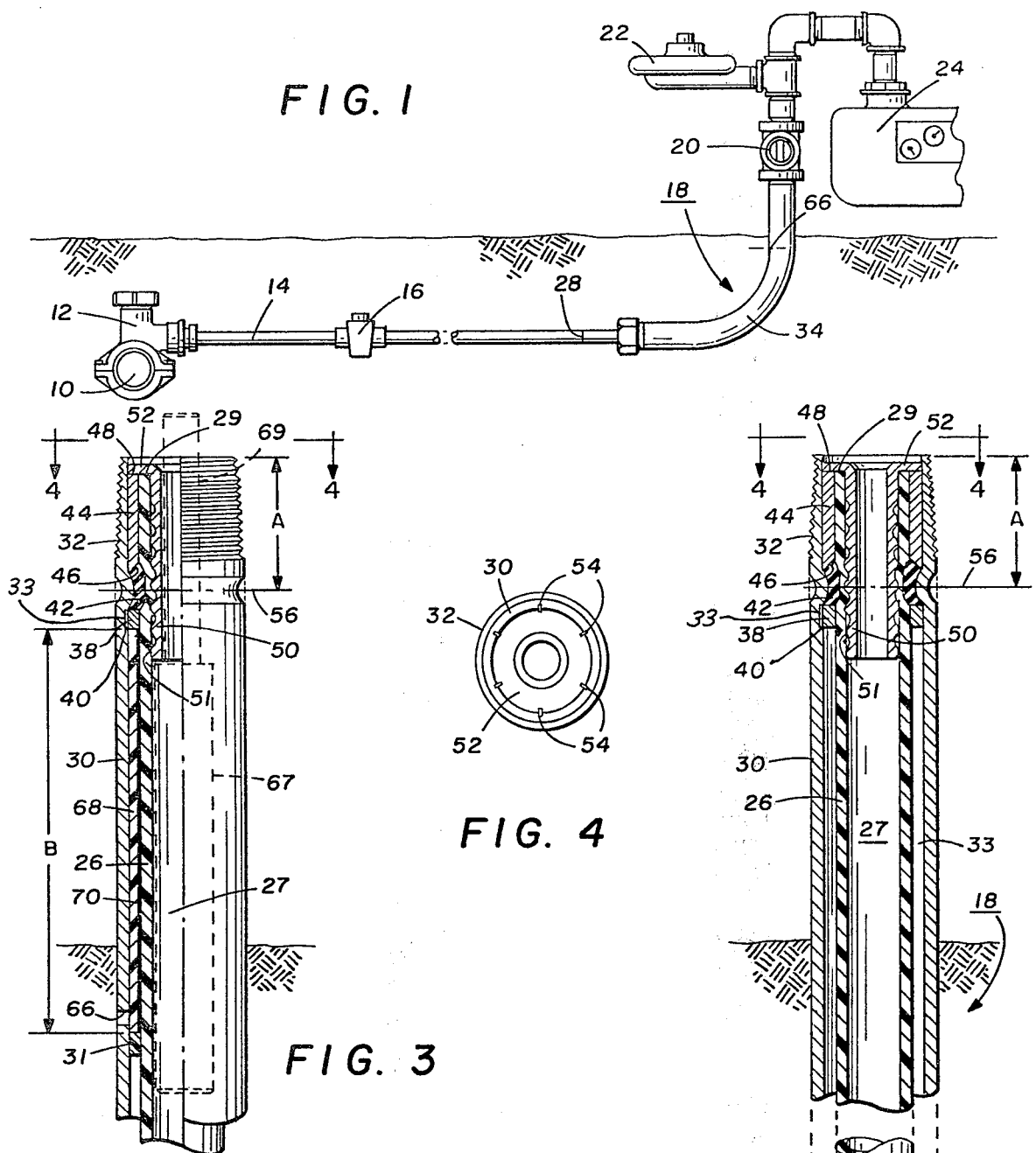
FIG. 1 illustrates a typical installation employing the service connector in accordance herewith.
FIG. 2 is an enlarged partially sectioned view of the service connector hereof suitable for max. 100° F. contemplated aboveground temperatures.
FIG. 3 is a fragmentary section comparable to FIG. 2 suitable for max. 150° F. contemplated aboveground temperatures.
FIG. 4 is an end elevation as viewed substantially along the lines 4—4 of FIGS. 2 and 3.

Referring initially to FIG. 1 of the drawings, there is illustrated a typical underground gas main 10 from which a service-tee 12 connects a polyethylene or other suitable plastic service line 14 through a shutoff type curb valve 16. Connecting with the service line at an underground location at which service is to be supplied is a service connector 18 in accordance herewith, as will be described. Service connector 18 rises from below ground at a fusion connection with service line 14 from its underground inlet end 28 to its aboveground outlet end 29 at which it is connected to a meter installation that typically includes a meter valve 20, a pressure regulator 22 and a meter 24 suitably piped together.

With reference now also to FIGS. 2–4. service connector 18 is comprised of a continuous length of Code approved polymer plastic tubing 26 defining a gas conduit 27. The tubing is sized to accommodate requirements of the particular service being supplied and on residential type service is normally on the order of about ⅝ inch O.D. For protecting the tubing against its environment, there is provided a tubular steel sleeve 30 of steel pipe or the like jacketing or shrouding the majority of tube length from underground to aboveground termination thereof. A centering ring 31 positioned intervening between the tubing and sleeve in the embodiment of FIG. 3 serves to maintain a concentric spacing 33 therebetween over their common length aboveground as will be understood. Thread 32 at the outlet terminal periphery of sleeve 30 enables a connection with meter valve 20. Fabrication is conducted with the components in straight form prior to forming elbow 34.

Critical to the construction hereof is that tubing 26 and sleeve 30 be axially interlocked providing, as required by Code, a minimum resistance against relative displacement at least equal to the tensile strength of tubing 26 at 100° or 150° F. for the respective embodiments. To achieve this relationship, the components are assembled with a bottoming ring 38 positioned in spacing 33 seated against an annular shoulder 40 on the inside surface of sleeve 30. Juxtaposed on the outlet side of bottoming ring 38 spaced a predetermined central distance "A" from the terminal outlet end of sleeve 30 is an annular resilient gasket 42 of sufficient hardness to be able when compressed to ensure the above mentioned interlocking force with tubing 26. Tandemly contiguous to the gasket as to cooperate with ring 38 for sandwiching the gasket therebetween is positioned an annular compression ring 44 beveled at its rear face 46 to match the complementary bevel engaged on gasket 42 and radially flush at its forward face 48. Extending within tubing 26 from its outlet end as to be in axially overlapping relation with the sandwiching rings 38 and 44 is a lock insert 50 ribbed at 51 on its periphery and radially flanged outward at 52 to retain compression ring 44 against outward movement therepast.

With the components assembled in the foregoing orientation, flange 52 and compression ring 44 are locally crimped together with a staking tool at various locations 54 (FIG. 4) about their common circumference in order to maintain angular orientation of the assembled parts during the interlocking step to follow. Thereafter, sleeve 30 is swaged sufficiently inward at distance A to effect an annular indented recess 56 from the previously smooth peripheral surface shown dashed thereat. On swaging at this location, condensed gasket 42 locally deforms tubing 26 into a sandwiching interlock with insert ribs 51. Since the interlock provided hereby is required by Code to have at least the strength of polyethylene tubing in tension at 100° F., it has been determined that gasket 42 should have a hardness on the order of at least 90 Shore A reading.

At the underground or inlet end, sleeve 30 terminates in a peripheral thread 58 on which is received a compression nut 60 for takeup compression of resilient gasket 62. Use of gasket 62 is optional and is ordinarily employed where desired to prevent ground water leakage to within the connector unit. Gasket 62 may be of a type disclosed, for example, in U.S. Pat. No. 3,259,406 that includes a conductive member 64. A length of exposed pigtail tubing 65 of dimension "C" is provided to customers' order for making the fusion connection at end 28.

In the specific embodiment of FIG. 2, at least the aboveground portion of riser spacing 33 for a distance "B" defines an air space rendering the unit capable of withstanding contemplated temperatures of on the order of 100° F. For increasing the temperature capability of service riser 18 to on the order of at least 150° F., the construction of FIG. 3 is employed. To effect the latter, the component parts are assembled in straight form prior to formation of elbow 34. An electrically conductive centering rod 67 shown in phantom is inserted in a friction slip fit from inlet end 28 until its ingress end 69 of reduced diamter to accommodate insert 50 protrudes beyond thread 32. With the exterior of tubing 26 wrapped with a reinforcing fiberglass tape 70, spacing 33 is then filled with an epoxy resin 68 applied in liquid form from a gun via an aperture 66 in the wall of sleeve 30. Centering rod 67 provides electrical circuit completion for operation of the gun and addition of epoxy is continued until filling of radial space 33 over length B extending below aperture 66. After fill of the epoxy is completed but before it hardens, centering gasket 31 is installed from end 28 to a location at the epoxy and surrounding rod 67. Once the epoxy has set, rod 67 is removed after which elbow 34 is formed.

Epoxy 68 is of a composition commercially available preferably characterized by viscosity which minimizes air bubble entrapment. Epoxy reinforcements other than preferred tape 70 could obviously be utilized such as woven fiberglass tubing, wrapped fiberglass filament, sheets of encircling fiberglass cloth cemented to the tubing, etc. A marker (not shown) placed over aperture 66 provides an indicia for belowground setting of the riser during installation.

By the above description there is disclosed a novel construction for a service connector enabling connection between a plastic underground gas service line and an above ground meter installation. By constructing the connection with a continuous plastic tubing of elbow configuration jacketed in a concentrically spaced steel sleeve to which it is axially secured and sealed pressure-tight, the meter riser is economically fabricated yet able to readily meet the performance and temperature limitations imposed by the Department of Transportation Code standards. Since the steel sleeve is not per se a gas carrying conduit, the cathodic protection previously required for steel gas piping is thereby eliminated as to resolve a long standing need in providing a plastic-to-plastic service connection for underground plastic conduit.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A gas service connector for connecting a plastic underground gas supply conduit to an aboveground installation comprising in combination:
   a. a plastic gas carryable connector conduit of continuous length extending from an inlet end adapted for connection to a plastic underground gas supply conduit to an outlet end adapted to terminate aboveground;
   b. a tubular metallic sleeve continuously jacketing said connector conduit in generally spaced relation thereabout from on an underground section of the connector conduit to a termination end at least encircling the outlet end of the connector conduit, said sleeve including coupling means at said termination end for connection to the installation with which the service connector is to be employed;
   c. seal means for effecting a gas-tight relation between said sleeve and said connector conduit;
   d. interlock means effectively interlocking said connector conduit and sleeve to resist axial displacement therebetween with a force at least equal to the tensile strength of said connector conduit at 150° F.; and e. a reinforced epoxy fill in the spacing between said sleeve and said connector conduit in at least a significant portion of their common aboveground length below the outlet end of said connector conduit.

2. In a gas service connector in accordance with claim 1 including a centering ring tandemly juxtaposed in said spacing below the epoxy fill for substantially maintaining annular uniformity of the spacing thereat.

3. In a gas service connector according to claim 1 including indicating means effective from exterior of said sleeve for ascertaining existence of said epoxy fill at a predetermined underground location of said spacing.

4. In a gas service connector according to claim 3 in which said indicating means comprises an aperture extending through said sleeve at said predetermined location in communication with said spacing rendering existence of epoxy thereat visible from exterior of said sleeve.

5. A gas service connector for connecting a plastic underground gas supply conduit to an aboveground installation comprising in combination:
 a. a plastic gas carryable connector conduit of continuous length extending from an inlet end adapted for connection to a plastic underground gas supply conduit to an outlet end adapted to terminate aboveground;
 b. a tubular metallic sleeve continuously jacketing said connector conduit in generally spaced relation thereabout from on an underground section of the connector conduit to a termination end at least encircling the outlet end of the connector conduit, said sleeve including coupling means at said termination end for connection to the installation with which the service connector is to be employed;
 c. seal means in the spacing between said sleeve and said connector conduit thereat for effecting a gas-tight relation therebetween, said seal means comprising an annular gasket in said spacing and ring means in said spacing axially sandwiching said gasket to limit compressive axial enlargement thereof; and
 d. interlock means in the aboveground section of said connector conduit and sleeve effectively interlocking said connector conduit and sleeve to resist axial displacement therebetween with a force at least equal to the tensile strength of said connector conduit at 100° F., said interlock means comprising a tubular lock insert within said connector conduit axially overlapping the ring means and gasket of said seal means and an annular inward deformation in the outer periphery of said sleeve radially depending against said gasket and said connector conduit.

6. A gas service connector in accordance with claim 5 in which said resistance force is at least equal to the tensile strength of said connector conduit at 150° F.

7. A gas service connector in accordance with claim 5 in which said spacing between said sleeve and said connector conduit comprises an air space in at least a significant portion of their common aboveground length below said interlock means.

8. In a gas service connector in accordance with claim 6 in which said spacing between said sleeve and said connector conduit includes a reinforced epoxy fill in at least a significant portion of their common aboveground length below said interlock means.

9. In a gas service connector in accordance with claim 8 including a centering ring tandemly juxtaposed in said spacing below the epoxy fill for substantially maintaining annular uniformity of the spacing thereat.

10. A gas service connector for connecting a plastic underground gas supply conduit to an aboveground installation comprising in combination:
 a. a plastic gas carryable connector conduit of continuous length extending from an inlet end adapted for connection to a plastic underground gas supply conduit to an outlet end adapted to terminate aboveground;
 b. a tubular metallic sleeve continuously jacketing said connector conduit in generally spaced relation thereabout from on an underground section of the connector conduit to a termination end at least encircling the outlet end of the connector conduit, said sleeve including coupling means at said termination end for connection to the installation with which the service connector is to be employed;
 c. seal means for effecting a gas-tight relation between said sleeve and said connector conduit;
 d. interlock means effectively interlocking said connector conduit and sleeve to resist axial displacement therebetween with a force at least equal to the tensile strength of said connector conduit at 150° F.; and
 e. a thermosetting resin fill in the spacing between said sleeve and said connector conduit in at least a significant portion of their common aboveground length below the outlet end of said connector conduit.

* * * * *